United States Patent [19]
Halsey

[11] 3,910,124
[45] Oct. 7, 1975

[54] NON-DESTRUCTIVE TESTING PROCEDURES

[76] Inventor: George H. Halsey, 63 Shady Dr., Indiana, Pa. 15701

[22] Filed: July 14, 1971

[21] Appl. No.: 162,510

[52] U.S. Cl. ................................................ 73/67.6
[51] Int. Cl. .......................................... G01n 29/04
[58] Field of Search................ 250/83.3 D, 219 DF; 356/239; 73/67.5 R, 67.6, 67.7, 67.85, 71.5

[56] References Cited
UNITED STATES PATENTS

| | | | |
|---|---|---|---|
| 2,618,968 | 11/1952 | McConnell | 73/67.7 |
| 2,870,336 | 1/1959 | Fountain et al. | 250/83.3 D UX |
| 3,013,170 | 12/1961 | Sheldon | 73/67.5 X |
| 3,036,151 | 5/1962 | Mitchell et al. | 73/67.85 UX |
| 3,097,522 | 7/1963 | Weller | 73/67.6 |
| 3,411,344 | 11/1968 | Lloyd | 73/67.2 |
| 3,417,610 | 12/1968 | Nance et al. | 73/67.7 |
| 3,588,513 | 6/1971 | Takatsuki | 250/219 DF |

*Primary Examiner*—James J. Gill
*Attorney, Agent, or Firm*—Donn J. Smith, Esq.

[57] ABSTRACT

A non-destructive testing arrangement comprises a source of penetrative energy capable of emitting an energy envelope primarily in one plane, and a receiver assembly positioned to intercept the envelope and capable of developing electric signals upon reception of said energy. Means are provided for mounting the source and the receiver assembly in spaced alignment, together with means for mounting a test specimen intermediate the source and the receiver assembly. The receiver assembly includes a tandem array or individual receivers, with the array being aligned with the expanding direction of the envelope. In other applications, means can be provided for imparting a series of motions to the test specimen.

21 Claims, 9 Drawing Figures

INVENTOR.
GEORGE H. HALSEY
BY
HIS ATTORNEY

INVENTOR.
GEORGE H. HALSEY
BY
HIS ATTORNEY

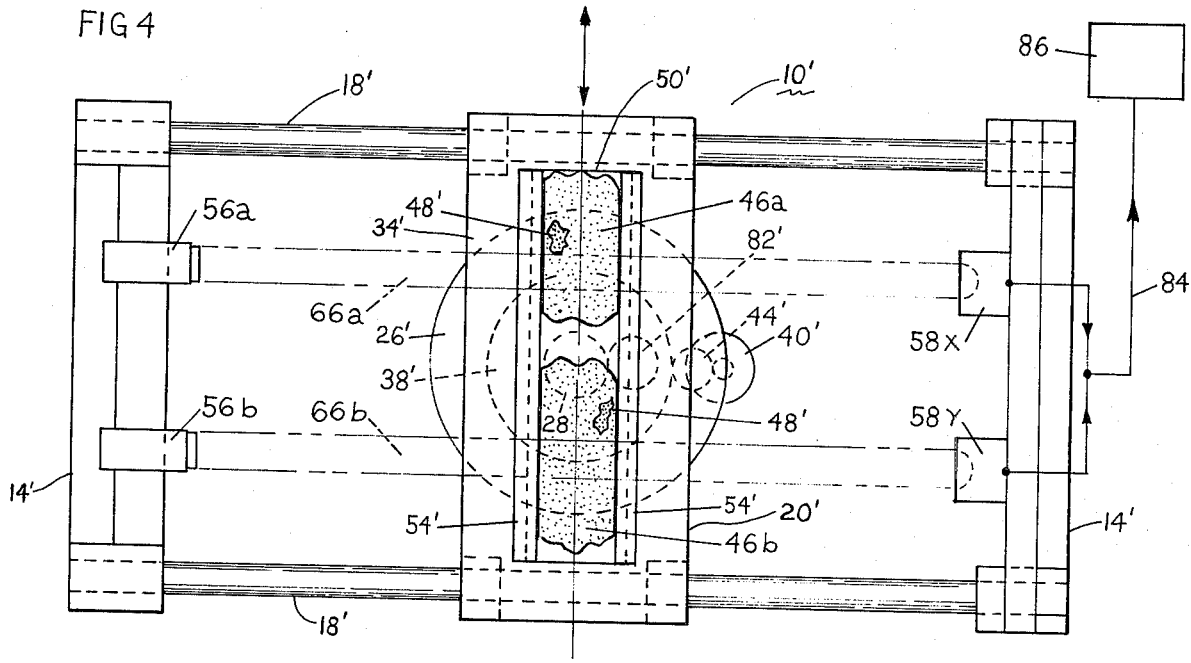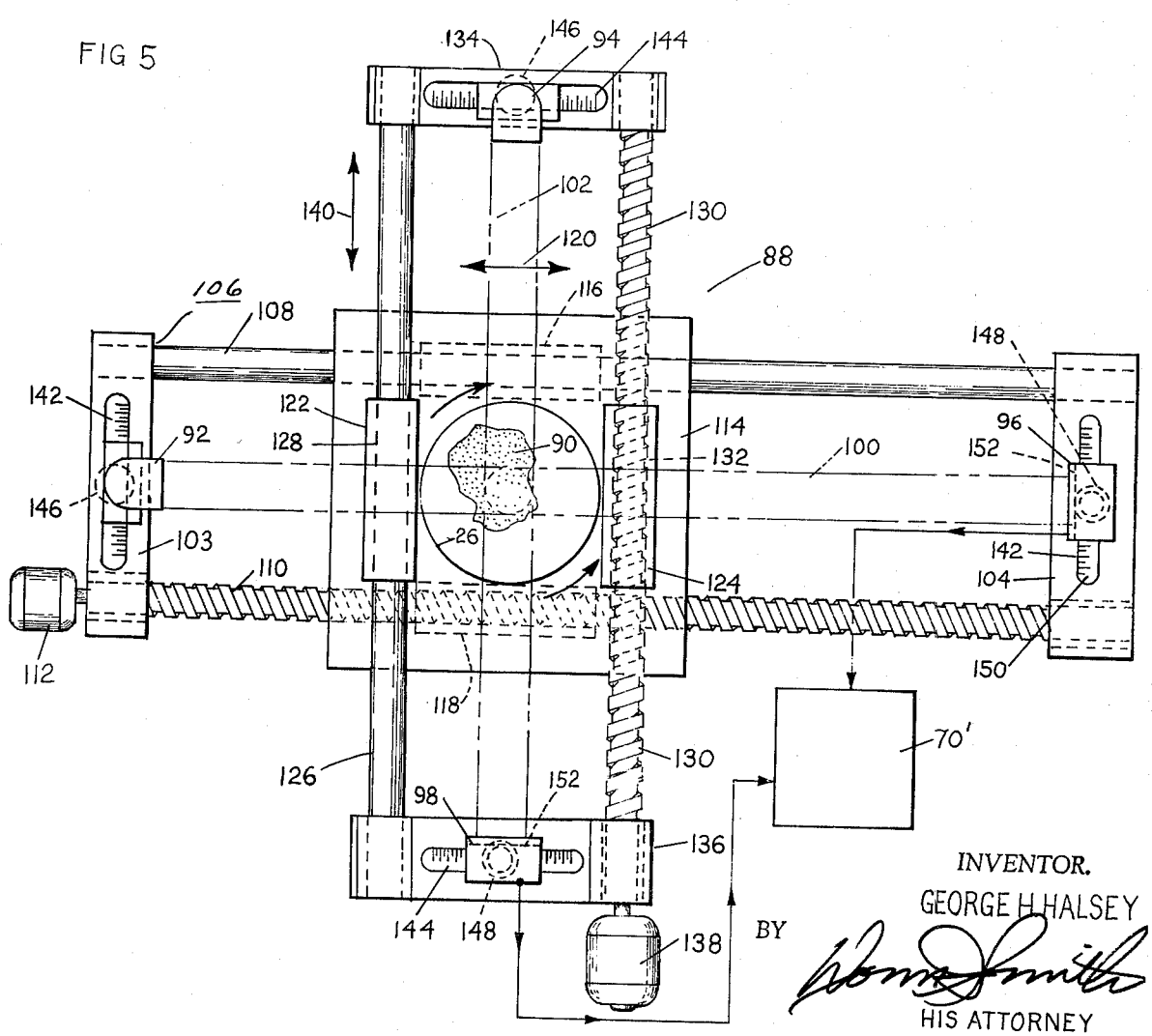

INVENTOR.
GEORGE H. HALSEY
BY
HIS ATTORNEY

INVENTOR.
GEORGE H. HALSEY
BY
HIS ATTORNEY

NON-DESTRUCTIVE TESTING PROCEDURES

The present application is related in certain aspects to the testing arrangements described and claimed in my copending applications filed concurrently herewith and respectively entitled Non-Destructive Testing Procedures - Movable Receivers Ser. No. 162597 and Non-Destructive Testing Arrangements - Movable Reflectors Ser. No. 162511.

The present invention relates to non-destructive testing procedures and more particularly to procedures of the character described which are capable of utilizing various forms of penetrative energies such as ultrasonics, microwaves, or x-rays, or combinations thereof. The invention provides a segmented receiver arrangement for the testing energy in order to increase the sensitivity of the testing apparatus. In addition, the invention provides means for imparting a series of predetermined movements to the test specimen for scanning thereof.

Known testing procedures have been unable to inspect properly for such defects as undue porosity, occlusions of foreign matter, and gage variations, when energies of relatively long wave length (such as x-band microwaves or relatively low frequency ultrasonics) are utilized. The problem arises from the defect having a much smaller size than the wave length of these testing energies, a very small defect has only a negligible effect upon a much larger wave in conventional testing procedures. The waves therefore, are incapable of carrying intelligible information to conventional receivers sensitive to the testing energies in use.

It is an expected result of the invention that small defects can be detected irrespective of relatively long wave lengths by utilizing one of the disclosed receiver arrangements for the testing energy. An ancillary feature of this invention, also quite unexpected, is the use of a particular motion or combinations of motions imparted to the test object for increasing the sensitivity of a particular receiver arrangement and for scanning the object. Owing to the absence of the order of sensitivity afforded by the invention, prior inspectional procedures have been unable to detect cure states, very small defects or occlusions, and certain types of porosity.

With this arrangement a very small anomaly or defect can be detected, even as small as one percent of the wave length. Thus, when using x-band microwaves as the energy source, an anomaly as small as 0.012 inch can be detected. In this area a segmented receiver or some form of scanning arrangement or multiple exposure of the test object, as provided by the invention, is highly desirable. With the testing arrangements of the invention, an anomaly, although very small, occupies a correspondingly larger percentage of the area of a given receiver increment. Moreover, the receiver system of the novel testing arrangement unexpectedly is able to sense turbulences in a relatively long wave energy passing around the anomaly. Detection of these turbulences is facilitated by a particular movement of the test object, when this feature of the invention is used, and also by repetitive scanning of the test object, all of which can provide a higher signal-to-noise ratio in accordance with the invention. The use of an incremental or segmented receiver coupled with movement of the object allows the very small anomaly to be inspected from slightly different locations simultaneously by a corresponding number of receiver increments. The signal integration or scan-averaging thus afforded by the invention, increases the efficiency the sensitivity of the testing arrangement in a surprising and unobvious fashion.

As noted previously, none of these beneficial advantages of the invention can be supplied by known non-destructive testing arrangements. The benefits of being able to detect anomalies of the order of ¼ inch in diameter or less or the cure states of various types of elastomers for example, without destructive testing, need scarcely be pointed out. Previous approaches have been to employ extremely high frequencies with related shorter waves to obtain some increase in resolution capability. This approach has been generally unsatisfactory, owing to equipment limitations and difficulties in handling ultra short wave energies. In the case of microwaves, another previous approach in the case of void detection has been to use the void as a secondary source and sense radiation at the 90° plane for a primary source, as an indication of the void location. Very high frequency systems are more expensive and less reliable in the case of microwave hardware, while ultrasonics require liquid couplants at the designated frequency. Use of the conventional microwave secondary source also have size limitations and is capable of detecting only voids in the test object.

The invention, then, relates to the inspection measurement, testing and control of materials, products, parts, processes and assemblies by use of non-destructive testing equipment procedures and methods, without sacrifice of acceptable items. The invention relates to the non-destructive measurement of the physical properties in metallic and non-metallic items in general, or combinations thereof, and also to improved means for the detection, location and measurement of local internal anomalies within these items. Such anomalies include, of course, the absence of the proper state of cure at a given location within the material or other test object. Similarly the testing procedures of the invention can detect the presence or absence of a bonding between similar or dissimilar materials or other components.

I am not aware of any acceptable solution proposed heretofore for the particular problems set forth herein and involving measurement of internal physical properties of a material. Adequate product control actually depends, at the present time, primarily on secondary laboratory measurements by destructive and wasteful testing of materials, products, components and the like, which can indicate only an averaged indication of the final product condition. Obviously, only a very small percentage of the final product can be tested destructively.

Another facet of the problem of non-destructive testing, or in any testing procedure, is the proper definition of the testing objective. As a practical matter a perfect material, product, or other component is rarely if ever found. The designer and the quality control expert must establish standards in recognition of this fact. However, the test engineer defines the testing objective as the detection of any deviation from perfection, i.e. from an absolute standard. The usual test system is concerned, therefore, with detecting deviations from a theoretically perfect case rather than as deviations from an acceptable standard. In the past this problem has been alleviated to some extent by the use of standards having a visual reference, dimensional marker, etc. More recently electronic standards have been employed. To date, however, comparative inspections have made only a single use of a standard, usually for comparing some external size or surface texture or configuration.

Briefly, I have solved this problem by setting up a recognized standard in the non-destructive testing equipment of the invention, which will yield a series of acceptable and recordable readings for comparison with subsequent test objects or other materials. Identical testing arrangements can be set up in parallel, according to the invention, to provide visual comparisons, if desired, between a test specimen and a "standard" specimen. Alternatively, the standard specimen can be placed in a single testing arrangement of the invention for recordation of "standard" data for subsequent comparison, to obtain an electronic "standard." An additional feature of this aspect of the invention stems from the scanning capability of the disclosed non-destructive testing procedures. Thus, every portion of a test object can be compared stepwise with every portion of an actual standard or an electronic standard. On the other hand, particularly where uniformity is a desired characteristic, each portion of test object can be compared with another portion of itself, for example the state of cure in a given portion of the test object can be compared with a state of cure in another portion. The same applies to detection of porosity or the presence or absence of voids in general in a given test object.

Known non-destructive testing procedures involving ordinary through-transmission of testing energies do not immediately provide the information afforded by the present invention as to the depth or other location of an anomaly in the test object. The novel testing procedures of the invention, however, involve imparting a controlled series of motions to the test object such that a three-dimensional analysis and precise location of an anomaly within the test object is afforded through proper data processing. The latter feature of the invention is unexpectedly cooperative with the scanning and segmented receiver aspects of the invention discussed previously. The segmented receiver of the invention unexpectedly permits viewing the anomaly from slightly differing angles while the scanning arrangement of the invention can be repeated to provide the aforementioned multiple "exposure." All of these aspects of the invention cooperate in turn with the sensing of a very small anomaly with respect to wave length to provide a practical detection and location of very small defects in the test object. Ancillary to this feature of the invention is the provision and the disclosed testing arrangement for a zoom type motion of the test object to facilitate identification and location of the anomaly. For this purpose, a particular energy envelope configuration has been found to be advantageous.

The invention also provides non-destructive testing procedures utilizing a combination of inspectional energies from plural sources at angles to one another and directed to a common test object in accordance with the invention. The aforementioned sources, in accordance with still another feature of the invention, can be capable of emitting the energies of different characters, for example a combination of angularly dsposed ultrasonic and microwave sources or of microwave and x-ray sources. The same of differing electronic standards can be respectively associated with receiver arrangements for these angularly displaces sources. Two pairs of crossed sources can be arranged, as provided unexpectedly by the invention, for the simultaneous inspection of a pair of specimens, one of which can be an actual "standard".

The use of microwave testing in conjunction with ultrasonics, particularly low frequency ultrasonics, is a very desirable but unexpected combination of the invention. These energies tend to complement one another in that ultraconic energy is sensitive to laminar conditions while microwave energy is sensitive to density changes, in the search for intra part or subsurface anomalies. Moreover, in the case of elastomer curing, research has indicated that ultrasonic energy tends to respond to overcure, while microwave energy is relatively insensitive to this condition. It is hypothesized that ultrasonics correlates to average molecule size while microwaves correlates to "free end" density. The respective "shadows" produced by these energies are variably effected by cross linking during cure and by increase in number of molecules during degradation.

The testing of metal-non-metal assemblies are of interest to this feature of the invention. Ultrasonic energy penetrates the metal component with greater facility, while microwave energy will penetrate the non metal component.

Other known non-destructive testing systems have been developed for determining heat treat condition in small items, using eddy current methods, or for determining grain size measurements using an ultrasonic measurement of acoustic velocity in the material. However, metal properties are still largely controlled through destructive, tensile testing of coupons or the like. In the field of non-metallic testing surface hardness measurements such as Shore durometer, can only result in gross judgments, as non metals ae rarely uniform throughout.

The non-destructive testing procedures of the invention unexpectedly afford a number of advantages. The disclosed procedures, for example, provide an excellent resolution capability irrespective of size of the anomaly. Other features of the invention provide a zoom capability permitting a continuous increase in magnification of a local area of the test object for detailed inspection of a questionable area. Lower frequency sources (long wave) can be utilized by the disclosed testing procedures with superior resolution while permitting greater penetration ability. In the case of ultrasonics, liquid couplants can be eliminated in most applications. The geometry of the disclosed system can be readily adapted for several optical type source-receiver systems, e.g. x-ray, high frequency ultrasonics, low frequency ultrasonics, and x-band microwave. In particular, the use of low frequency ultrasonics permits all materials to be tested with high resolution capability. Detection of progressively larger differences in physical properties is made possible by the invention with respect to comparisons between a test object and a "standard" object, between differing scan areas within the single test object, or between differing portions within a local test area of the test object.

The non-destructive testing arrangements of the invention are emminently versatile, and inspection of complex shapes with the same accuracy and ease as simple shapes is permitted. A wide range of materials can be inspected, along with the wide range of sizes and shapes of test objects. Flaws, defects, foreign occlusions, and other anomalies can be detected together with inspection of internal physical properties, without loss of resolution in any case. As evident from the following detailed description, the testing arrangements of the invention can be set up simply and easily, and readily calibrated. Deviations from an acceptable actual or electronic standard can be indicated readily in avoidance of a theoretically "perfect" reference. Even "defective" but acceptable standards can be used directly in the disclosed testing arrangements.

Source-receiver variations can be cancelled out through use of a set-up procedure employing two standard parts. The disclosed testing arrangements can be varied readily to obtain a given precision of anomaly location and size. Adaptations to combine types of energy sources can be readily made. The size of system components can be varied readily depending upon the anticipated sizes of test objects.

The invention has been considered in conjunction with the following U.S. Pat. Nos. which would appear to be representative of the prior art on this subject:

| | | | |
|---|---|---|---|
| O'Connor, et al | 3,548,644 | Bacon | 3,028,752 |
| Phelan | 3,534,591 | Carlin | 2,932,189 |
| Silverman | 3,461,420 | Morris | 2,378,237 |
| Colgate | 3,402,598 | Carson | 2,700,895 |
| Wendt, et al | 3,373,602 | Valkenburg et al | 2,787,158 |
| Wood et al | 3,322,278 | Sheldon | 3,013,170 |
| Wood et al | 3,295,362 | Drake | 2,628,335 |
| Joy | 3,166,731 | Renaut | 2,862,384 |
| Steinbaecher | 3,159,023 | Renaut | 3,163,784 |
| McClure | 3,107,521 | Pear | 3,379,060 |
| Hitt | 3,058,338 | Schwartz | 3,410,363 |
| Renaut | 3,052,155 | Weighart | 3,555,889 |

None of these references nor any combination thereof discloses, teaches or implies the unique combinations and unexpected results of the invention as set forth above.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same wherein:

FIG. 4 is a top plan view of another non-destructive testing arrangement of the invention incorporating the use of an actual standard;

FIG. 5 is a top plan view of still another non-destructive testing arrangement of the invention showing the use of cross testing of a single specimen, with sources and receivers at respective angles;

Figure 1:
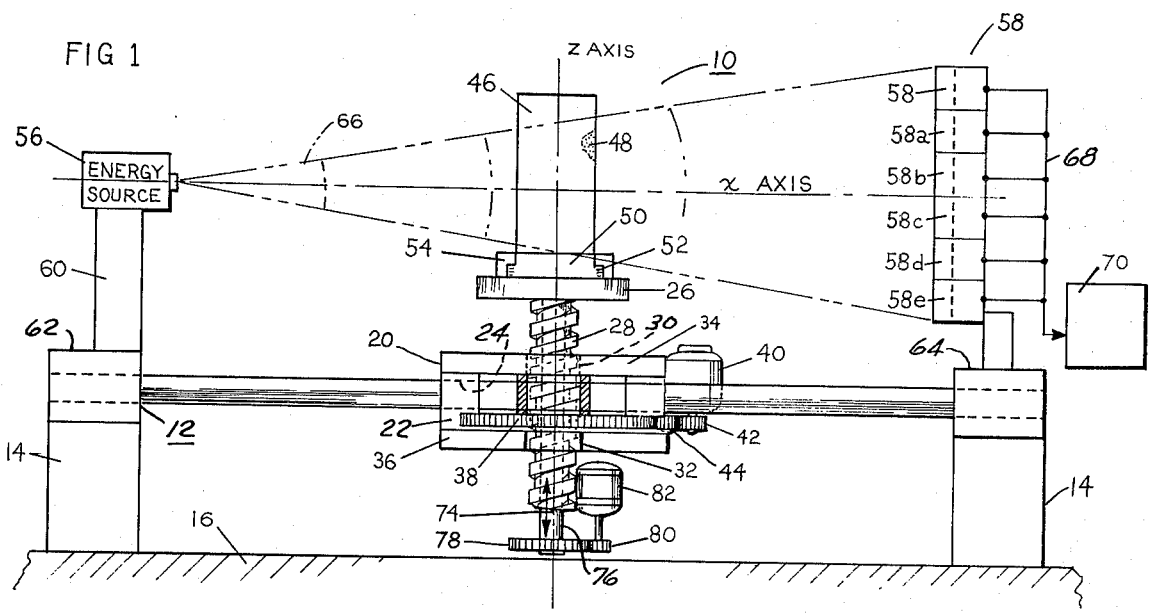
FIG. 1 is a side elevational view of an exemplary nondestructive testing arrangement of the invention.
Figure 2:
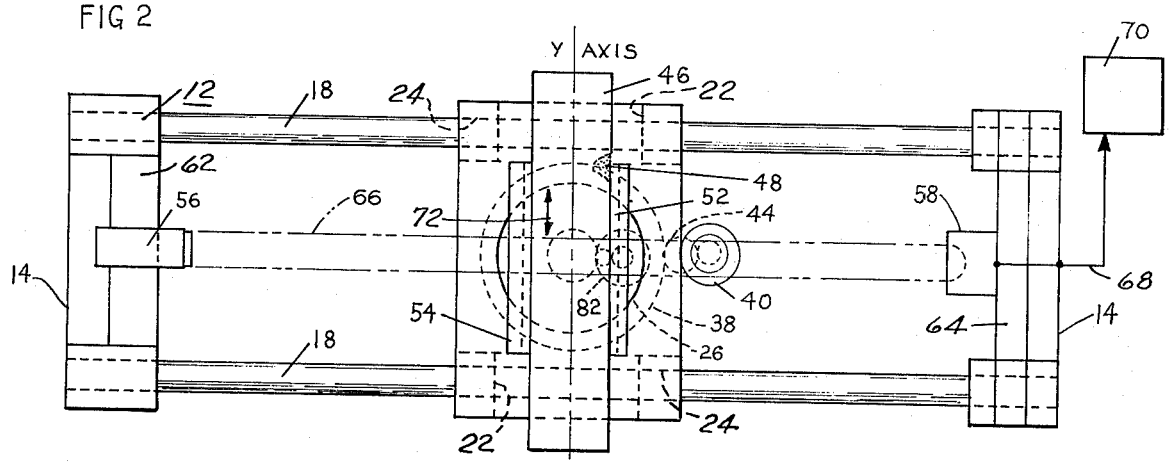
FIG. 2 is a top plan view of the apparatus as shown in FIG. 1.
Figure 3:
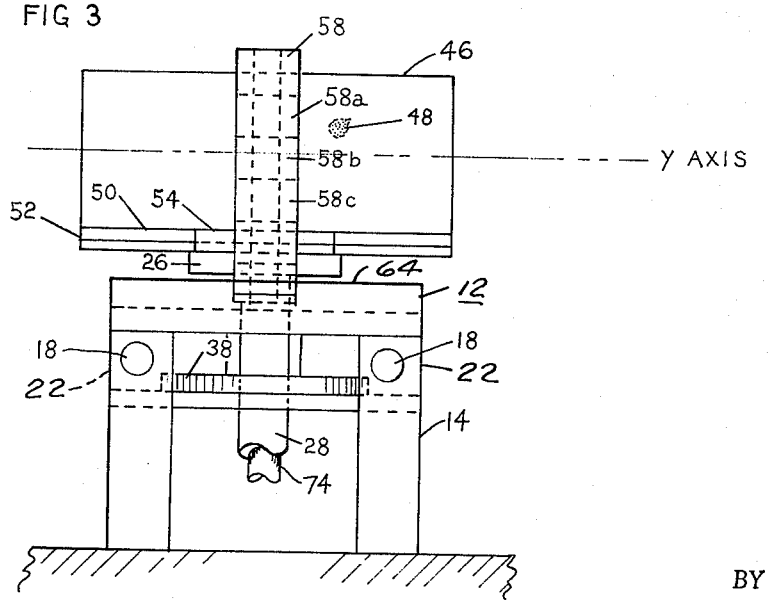
FIG. 3 is a right end elevational view of the apparatus as shown in FIG. 1.

Referring now to FIGS. 1–3 of the drawings the exemplary non-destructive testing arrangement 10 shown therein comprises a supporting framework 12 having in this example a number of standards 14 mounted on floor 16 or other suitable supporting surface. Extending between each pair of standards 14 and better shown in FIG. 2 are slide rail means 18 on which a test platform 20 desirably is slidably mounted. The test platform 20 is provided with at least one bearing block 22, an aperture 24 of which forms a sleeve bearing for slidable engagement with an associated slide rail 18. In the arrangement of FIGS. 1–3, the rail means 18 include a pair of generally parallel rails, and two such bearing blocks 22 engage each slide rail 18. The test platform 20 can be moved manually along the slide rails 18 or alternatively one of the slide rails 18 can be threaded and rotatably mounted in its associated supports 14 for threaded engagement with the associated bearing blocks 22, which can be tapped for this purpose. This can be arranged after the manner disclosed of the drawings. Alternatively again a piston and cylinder arrangement, rack and pinion, cable and pulley, or other mechanical linkage can be utilized for powered movement of the test platform 20.

A specimen table 26 is rotatably mounted on the platform 20, and in this case includes a threaded lead screw 28 which is inserted loosely through aperture 30, 32 in upper and lower plates 34, 36 of the platform 20. The lead screw 28 and turntable 26 are supported on the bottom plate 36 of the platform 20 by means of drive gear 38 having a central threaded aperture enmeshed with the lead screw 28. The drive gear 38 is driven by means of reversible motor 40 through output pinion 42 and idler gear 44 to raise and lower the specimen turntable 26.

A test specimen or object 46, which may have an anomaly 48 therein, is mounted on the turntable 26. Desirably the specimen 46 is supported on a specimen holder 50 which is slidably mounted on the turntable 26 and provided with lateral flanges 52. A pair of angle members 54 are spacedly mounted on the turntable for complementary engagement with the holder flanges 52 to retain the holder on the turntable. When positioned as shown the slidable holder 50 permits transverse adjustments of the test specimen 46 relative to the slide rails 18. When the turntable 26 is rotated to a position normal to that shown the slidable holder 50 then permits fine positional adjustments of the test specimen 46 longitudinally of the slide rails 18.

An energy source 56 and a receiver assembly 58 are mounted adjacent the ends respectively of the supporting framework 12. As better shown in FIGS. 1 and 2 the energy source is mounted on a standard 60 which in turn is mounted on crossbrace 62. The receiver assembly 58 is similarly mounted on cross brace 64 at the other end of the framework 12. The elevations of the energy source 56 and receiver 58 are such that the source 56 desirably is substantially centered relative to the receiver arrangement 58.

In keeping with the principles of the invention, the energy source 56 can be a source of any suitable form of penetrative energy such as ultrasonics, microwaves, x-rays or the like. A suitable ultrasonic generator to serve as the source 56 is available from Branson Instruments, Incorporated, of Stanford, Connecticut, Model No. Series 600. The receiver assembly 58 is arranged of course to receive the particular energy emitted by the source 56. Desirably the receiver 58 is a columnar arrangement of individual receivers 58a, 58b, 58c, 58d and 58e for example. A greater or lesser number of individual receivers 58a–58e can be utilized to form the segmented receiver assembly 58 depending upon the application of the invention and the resolution desired. The columnar array of receivers 58a–58e can be assembled from individual ultrasonic transducers or receivers available from Branson Instruments, Inc., Stanford, Connecticut, type no. 2-103-B.

Microwave sources and receivers can be substituted in any of the forms of the invention illustrated herein. Suitable sources and receivers for this purpose are available for P R D Electronics Inc. of Westbury, New York, Model PRD L-712B (source) and PRD 6301 (bolometer), PRD 6608 (bolometer mount). Likewise sources and receivers of x-rays and other types of radiation can be substituted. Suitable forms of x-ray equipment for this purpose are identified in my aforementioned copending application Ser. No. 162,597.

The use of the thus segmented receiver arrangement 58 in cooperation with a single energy source 56 considerably and unexpectedly increases the efficiency and resolution of the nondestructive testing arrangement 10. As evident from FIG. 2 and 3 each of the individual receivers 58a–58e form a relatively small portion of the total receiving area of the segmented receiver 58. Accordingly, the aforementioned anomaly 48 produces the shadow or energy perturbations having an appreciable area at an individual one of the receivers 58a–58e, but would be negligible and therefore undetectable in a single receiver having the combined area of the segmented receiver 58. Thus, the efficiency and resolution capability of the testing arrangement 10 is correspondingly increased while the minimum size of detectable anomaly 48 is correspondingly reduced.

The disposition of the individual receivers 58a–58e in a stack or column reduce to a small fraction the number of receivers which would be required by an area type receiver. Of course, the resolution of the testing apparatus 10 can be increased further by increasing the number of individual receivers in the receiver column 58.

The use of a single row or stack of receivers 58a–58e is made more practical by use of a single energy source having an output energy wave or envelope 66 which fans in one plane only as evident from FIG. 2. Alternatively, a collimating slot structure (not shown) can be substituted. The use of a flat envelope (although not essential) minimizes the number of receiver increments and conserves testing energy. The sensitivity of each individual receiver thus is determined by the horizontal width (FIG. 2) of the energy envelope 66 and the vertical dimension of each receiver. Thus, the shape of the energy envelope 66 cooperates with the segmented receiver arrangement 58 in an unexpected manner to increase the efficiency and resolution of the testing arrangement 10.

The vast majority of ultrasonic and microwave sources can readily be configured or shaped by known techniques to emit a desired envelope configuration. Although an x-ray "envelope" can be shaped to some extent by shaping the target, a collimating structure usually is necessary for a flat envelope. In beta sources the energy "envelope" can only be varied by modifying the window of the beta container or "bomb."

The individual receivers are connected through a branched conductor arrangement 68 which conveys the individual outputs of the receivers 58a–58e to a computer or other data analyzing circuitry for recordation and analysis of the output of the testing arrangement 10. The computer or other circuitry 70 for this purpose is well known and need not be further described.

As noted previously the test platform 20 and the supporting framework 12 are structured such that the platform 20 is capable of a combination of motions. In the illustrated arrangement there is provision for four such motions, X Y Z, W. It will be understood, however, that in keeping with the basic segmented receiver concept of the invention, that the number of motions can be reduced or movement of the platform 20 and test specimen 46 can be omitted altogether. However, the use of one or more of the described motions, which can be imparted to the platform 20 and the test specimen produces a unique and efficient testing procedure, particularly in combination with the segmented receiver arrangement.

When the test specimen holder 50 is disposed transversely of the slide rails 18 as shown in FIGS. 1–3, the test specimen 46 can be moved as denoted by arrow 72 to align a central area of the test specimen or any part thereof with the energy envelope 66. This facilitates inspecting the test specimen 46 part by part or area by area, without need for adjusting either the source 56 or the receiver assembly 58. Rotation of the turntable 26 and the specimen 46 allows the specimen to be inspected from any side thereof. In addition, the specimen 46 can be moved transversely of the energy envelope 66 (arrow 72) such that an anomaly 48 is near the center of rotation of the specimen and within the confines of the envelope 66. Rotation of the specimen, then, yields an indication of the depth of the anomaly within the specimen.

For these test specimens which project above or below the energy envelope 66 the lead screw 28 is actuated by drive means 40 and gear train 38–44 as described previously to raise and lower the turntable 26 (arrow 74). The turntable 26 can be rotatably mounted on and relative to the lead screw 28 by means of its drive shaft 76 rotatably extending therethrough and keyed for slidable but nonrotative engagement with drive gear 78. The gear 78 is driven by pinion 80 and drive means 82. In addition to moving the test object 46 relative to the energy envelope 66, raising and lowering of the test object is efficacious in moving the shadow or other indication of the anomaly 48 to the receiving area of another one of the individual receivers 58a–58e for cooperation or comparison purposes.

The platform 20 is also is capable of a "zoom" motion when slid along the slide rails 18. As noted previously the latter motion of the platform can be accomplished manually or by a suitable drive arrangement. By moving the platform 20 and test object 46 toward the energy source, a magnification of the shadow or perturbation wrought by the anomaly 48 occurs in the vertical direction, as the energy envelope expands in only one plane as aforesaid. On the other hand movement of the specimen to a position closely adjacent the segmented receiver 58 overcomes the tendancy of the energy wave to attenuate over an otherwise intervening distance between the test specimen 46 and the receiver 58.

As pointed out previously, an electronic "standard" can be fed into the computer or other analytic circuitry 70 for comparison with the array of signals transmitted thereto from the segmented receiver 58. The electronic standard can be correlated with a predetermined cycle of the previously described object movements for a given specimen.

By suitable movement of the test specimen 46 it is evident that a rather large test specimen can be inspected part by part throughout its total area and volume with a single source and a relatively small array of receivers. In addition to affording greater efficiency and resolution capability, the use of a single source together with a limited or columnar array of receivers assures that uniform energy quanta are applied over the surfaces of the test specimen and the individual receiver.

Referring now to FIG. 4 of the drawings where similar reference characters with primed accents or further identified with reference letters denote similar components of FIGS. 1–3, a modification of my non-destructive testing arrangement 10' is shown therein. The testing arrangement 10' is arranged for inspecting two test objects or specimens 46a, 46b simultaneously and more particularly a comparison of an unknown specimen such as the object 46a and an actual standard such as the object 46b. Accordingly identical sources 56a, 56b are provided in alignment with a pair of identical receiver assemblies 58x, 58y. Each of the receivers 56x or 56y is a segmented columnar receiving assembly, similar to that shown in FIGS. 1 and 3 of the drawings. A conductor system 84 conducts the signal outputs of the two receiving assemblies 58x, 58y to a computer memory unit and comparative data analyzer 86, of conventional design. The two test specimens 46a, 46b can be mounted by side on a single specimen holder 50', or alternatively two specimen holders (not shown) can be provided for mounting the specimens individually on the turntable 26'. Alternatively again, separate turntables (not shown) can be provided for the specimens 46a, 46b after the manner of FIGS. 7 and 8. The turntable 26' and the specimen platform 20' otherwise an be provided with the movement capabilities described in connection with FIGS. 1–3 of the drawings.

The non-destructive test arrangement 10' is admirably suited for testing two specimens simultaneously under identical conditions. Therefore, one of the specimens for example the object 46b can be a standard against which a number of specimens similar to specimen 46a can be tested successively. For this purpose it is highly desirable that the two energy sources 56a, 56b and the two receiving assemblies 58x, 58y be as nearly identical as possible. Thus, the test specimens 46a, 46b can be positioned to intercept, respectively, substantially identical energy envelopes 66a, 66b. As noted previously, it is not essential that the "standard" specimen 46b be a theoritically perfect specimen but on the contrary the standard specimen may have a number of negligible defects permissible in a given application. More to the point, the receiving assemblies 58x, 58y can be structured in the manner noted previously for example, such that negligible defects either in the standard 46b or in the test object 46a will be "invisible."

Figure 6:
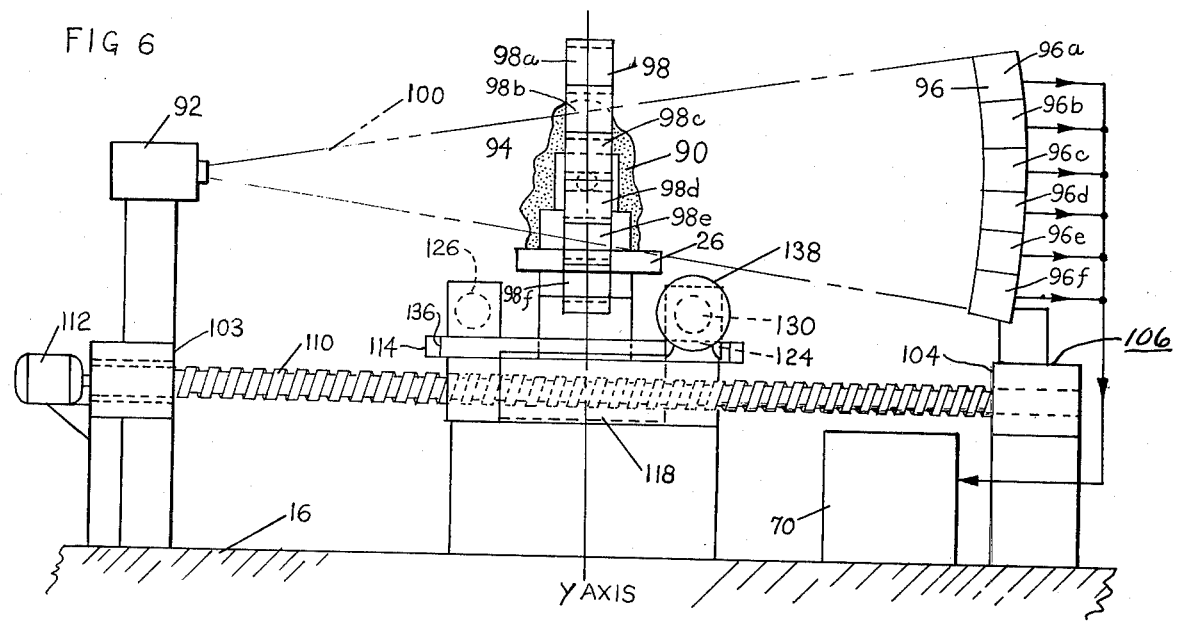
FIG. 6 is a side elevational view of the apparatus as shown in FIG. 5.

Referring now to FIGS. 5 and 6 of the drawings, another form of the novel non-destructive testing arrangement 88 is illustrated herein. The testing arrangement 88 is configured for the application of crossed energy envelopes upon a single test object such that the location or depth of an anomaly within the test object 90 can be determined more readily. In the illustrated example a pair of energy sources 92, 94 are mounted at an angle to one another and exemplarily at a right angle as shown. A pair of receiver assemblies 96, 98 are similarly mounted to receive respective energy envelopes 100, 102 from the sources 92, 94. In the arrangement of these figures, the energy sources 92, 94 and receivers 96, 98 can be similar in the respect of sending and receiving the same type of energy such as ultrasonics. On the other hand, particularly where defects or anomalies visible to different types of energies may be present, sources and receivers for differing energies such as a combination of ultrasonics and microwaves can be utilized after the manner of FIG. 9.

In the illustrated arrangement the energy source 92 and the receiver assembly 96 are mounted respectively on end supports 103, 104 forming part of the supporting framework 106 of the testing apparatus 88. Extending between the end supports 103, 104 are guide means such as a pair of guide rails 108, 110, the latter of which is rotatably mounted adjacent its ends in each of the end supports 103, 104. Desirably the guide rail 110 is threaded throughout its length and driven by suitable motive means such as electric motor 112.

A specimen platform 114 is mounted on the guide rails 108, 110 by means of a first support or bearing block 116 which slideably engages the guide rail 108. The specimen platform 114 is provided with a second support or threaded block 118 which threadedly engages the second guide rail or lead screw 110. Accordingly rotation of the lead screw 110 by the motor 112 causes the specimen platform 114 to be traversed between the end supports 103, 104, as denoted by a double arrow 120.

Mounted atop the specimen platform 114 are similar first and second supports 122, 124. The supports 122, 124 in this example are disposed at right angles to the first mentioned platform supports 116, 118 although some other angle of disposition obviously can be employed, where the second source 94 is intended to be placed at some angle other than a right angle to the first source 92. A guide mechanism is mounted for moving relative to the supports 122, 124 and include a first guide rail 126 slidably extended through aperture 128 in the first upper support 122 of the platform 114. A second guide rail in this case a lead screw 130 is threadedly extended through tapped aperture 132 of the second upper platform support 124. At the respective ends of the upper guide rails 126, 130, there are mounted a pair of end brackets 134, 136, which are rigidly secured to the ends of the slide rail 126 and rotatably secured to the ends of the lead screw 130. The second source 94 and the second receiver assembly 98 are mounted respectively on the end brackets 134, 136 at such heights that the center line of the energy envelope 102 substantially and desirably intersects the center line of the energy envelope 100 as better shown in FIG. 6.

At least one end of the upper lead screw 130 is extended through one of the end brackets for example the bracket 136 for connection with the suitable motive means such as electric motor 138. Rotation of the upper lead screw 130 thereby causes the platform 114 effectively to traverse the distance between the second source 94 and the second receiver assembly 98. In actuality, the source 94 and receiver 98 and the supporting framework therefore including the guide rails 126, 130 and the end brackets 134, 136 are moved relative to the platform 114 as denoted by double headed arrow 140. With the arrangement of FIGS. 5 and 6, as thus far described, the tests specimen 90 can be traversed relative to either of the energy sources 92, 94 or both without leaving the intersection region of their respective envelopes 100, 102.

Motion of the platform 114, in the direction of arrow 120, carrying with it the second source 94 and second receiver 98 and associated supporting structure, results in magnification or a "zoom" function relative to the first source 92 and receiver assembly 96. On the other hand movement of the second source 94, receiver 98 and associated framework relative to the platform 114 by operation of motor 138 creates a similar zoom function of the test specimen 90 relative to the second source 94 and receiver 98. However, irrespective of whether the lead screw 110 or the lead screw 130 or both are rotated the test specimen 90 remains at the intersecting region of the energy envelopes 100, 102.

Lateral adjustment of each of the sources and receivers 92, 96 or 94, 98 relative to the test specimen 90 is provided by a transverse slot 142 or 144 in each of the end supports 102, 104 or 136, 136 respectively. A headed stud 146 or 148 rides in each of the slots and maintains the associated source or receiver assembly in its proper upright position. The headed stud and the slot can be provided with ribbed surfaces 150 or other suitable indexing means to assure that each source and its associated receiver can be moved through identical distances in each adjustment direction, when desired.

The remainder of the specimen platform 114 can be structured similarly to the platform 20 of FIGS. 1–3, and similar reference characters with primed accents are used to denote similar components. Thus, the specimen 90 is mounted on a turntable 26' which is elevated by means of motor 40' and associated components, and additionally is rotated by means of motive means 82' and associated components. The test specimen 90 is accordingly capable of four differing movements relative to each of the sources 92, 94, considering of course the lateral adjustments of these sources, together with their respective receivers 96, 98.

For greater accuracy in size determination of a given anomaly each of the receiver assemblies is provided with a concave surface 152 facing the associated source 92 and 94. The arcuate surface 152 of each receiver subtends an arc having a radius equal to the distance between the receiver 96 or 98 and its respective source 92 or 94. Accordingly each of the individual receivers 96a–96f of the columnar receiver assembly 96, for example, is equidistant from the source 92, as better shown in FIG. 6. A similar relationship exists between the individual receivers 98a–98f and their associated source 94.

Figure 7:
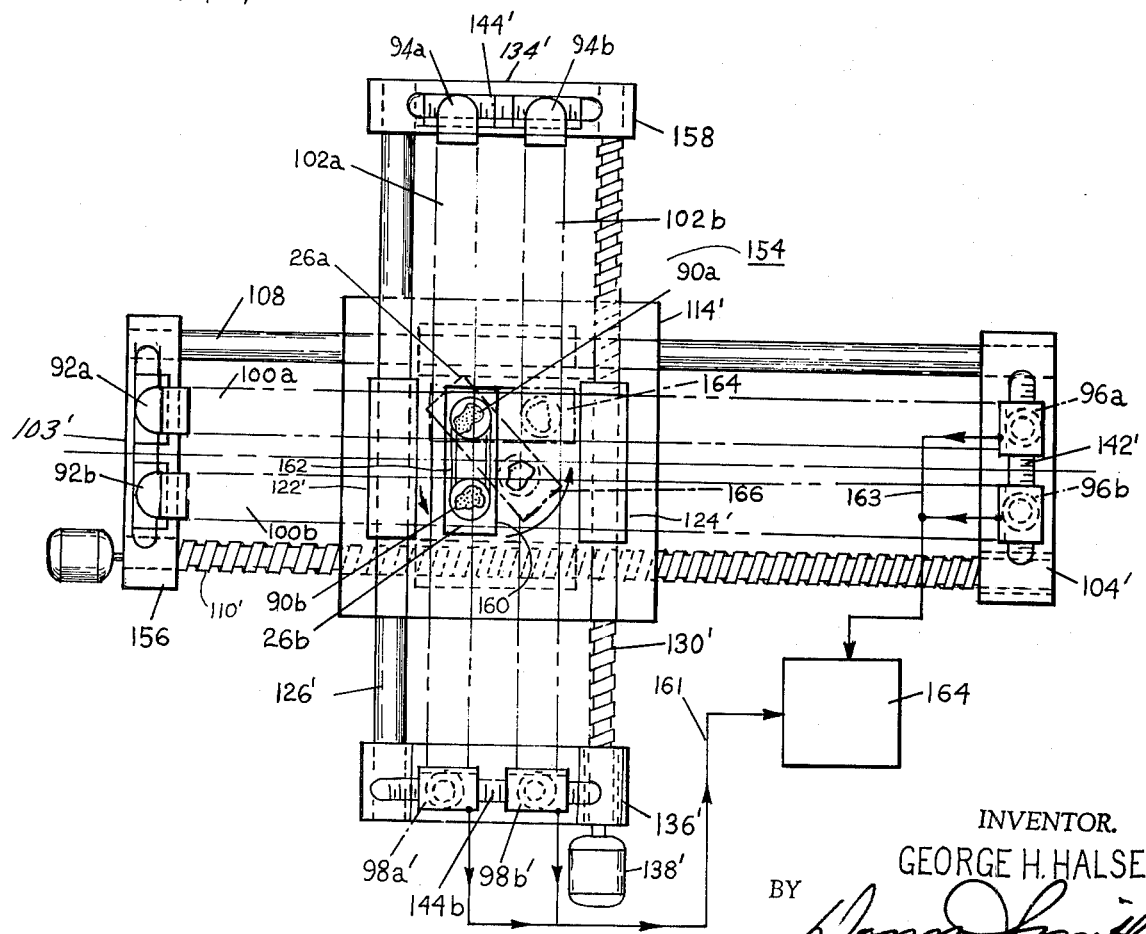
FIG. 7 is a top plan view of still another nondestructive testing arrangement of the invention showing the use of cross testing as modified for two specimens, one of which can be an actual standard.
Figure 8:
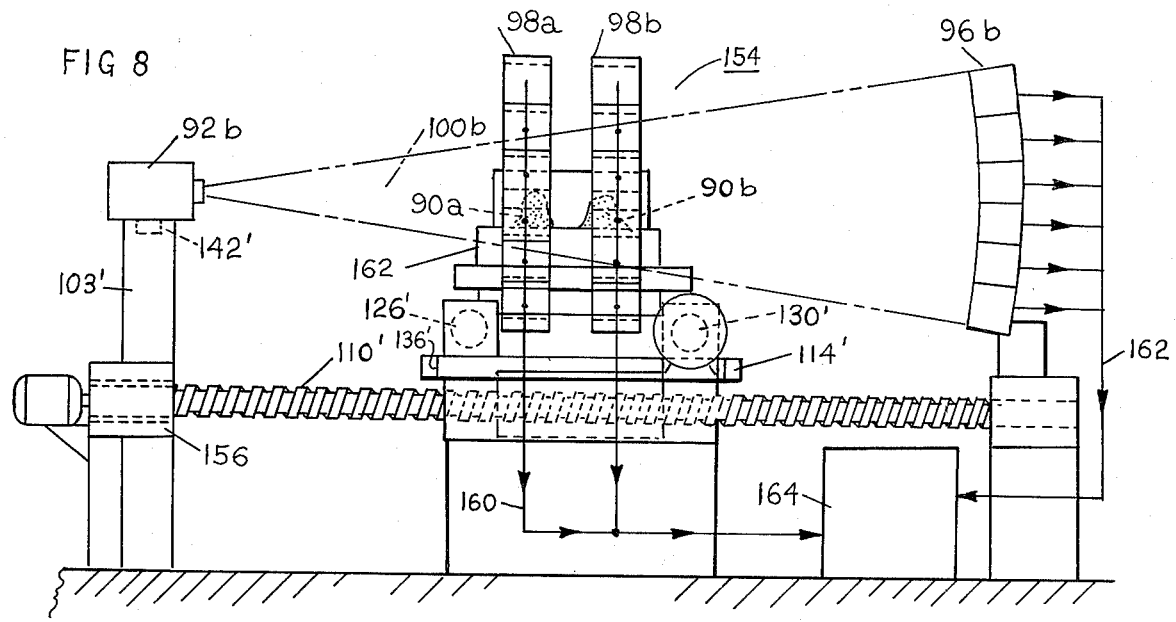
FIG. 8 is a side elevational view of the apparatus as shown in FIG. 7.

Referring now to FIGS. 7 and 8 of the drawings, another exemplary non-destructive testing arrangement 154 of the invention is disclosed therein. The latter arrangement of the invention is similar in many structural respects to that shown in FIGS. 5 and 6, and similar reference characters with prime accents are employed to denote similar components. Thus, specimen platform 114' is mounted for longitudinal movement along guide means including rails 108', 110' forming part of the supporting framework of the testing arrangement 154. In the same manner a supporting framework including guide rails 126', 130' is mounted for movement thereof with respect to the platform 114' and transversely of the first mentioned movement thereof.

The testing arrangement 154, however, is arranged for simultaneous inspection of a pair of test objects 90a, 90b and utilizes in this arrangement two pairs of crossed sources 92a, 92b, and 94a, 94b. The sources 92a, 92b are mounted on end brace 103' of the stationary supporting structure 156 while the other pair of sources 94a, 94b are mounted together on end bracket 134' of the movable supporting structure 158. The cooperating pair of receiver assemblies 98a', 98b' are similarly mounted on the other end bracket 136' of the movable framework 158. Likewise a pair of receiver assemblies 96a, 96b are mounted together on the other end brace 104' of the stationary supporting structure 156. Electrical lead systems 161, 163 conduct the signal outputs of the two pairs of receiver assemblies to a suitable computer memory unit and comparative data analyzer 165 of conventional design.

The testing arrangement 154 is admirably suited for the simultaneous cross testing of a pair of specimens 90a, 90b, one of which can be a "standard" as noted previously. For the latter purpose each pair of sources 92a, 92b or 94a, 94b are desirably identical to one another, as are their corresponding receiver assemblies. The pair of sources 92a, 92b, however, can be substantially different from the pair of sources 94a, 94b and can be capable of emitting a different type of penetrative energy. For example, the sources 92a, 92b can be ultrasonic generators, while the sources 94a, 94b can be microwave or x-ray generators. Each of the sources and each of the receivers desirably are mounted for lateral adjustment thereof relative to their respective supporting structure 156 or 158 by means of slots 142', 144' and associated components as described previously in connection with FIGS. 5 and 6 of the drawings.

On the specimen platform 114'a pair of turntables 26a and 26b are rotatably mounted, on each of which is mounted the specimen 90a or 90b. The turntable 26a is rotated and elevated after the manner described in connection with the preceeding figures. Swingably mounted on the drive shaft 76' (beneath the turntable 26a but above the vertical lead screw 28' as shown in FIG. 8) is a turntable platform 160 with the turntable 26b rotatably mounted thereon adjacent its outward or free end. The turntable 26b can be spaced upwardly of its support 160 so as to be on substantially the same elevation as that of the turntable 26a. Desirably the turntable 26b is slaved to the turntable 26a by means of transmission belt 162 for rotation therewith irrespective of the swung position of the turntable support 160. The slaved turntable 26b thus is rotated at the same speed as that of the turntable 26a and is elevated by means of its support 160 to the same extent as the turntable 26a.

The turntable support 160, in its solid-outline position as shown in FIG. 7, positions the test specimens 90a, 90b so that they are equally irradiated by the energy envelopes 100a, 100b respectively. On the other hand, when the turntable support 160 is swung to its chain-outline position 164 (FIG. 7) the test specimens 90a, 90b are equally irradiated by energy envelopes 102a, 102]b or the sources 94a, 94b. On the other hand, by moving the turntable support 160 to an intermediate position (chain-outline 166) and by adjusting the sources 92b and 94b closer to their respectively associated sources 92a, 94a the test specimens 90a, 90b can be irradiated simultaneously with both pairs of energy envelopes 100a, 100b and 102a, 102b. Suitable indexing means (not shown) can be mounted on the platform 114' and on the swingable support 160 for detention of the platform respectively at its positions as denoted by reference characters 160, 164, 166.

Figure 9:
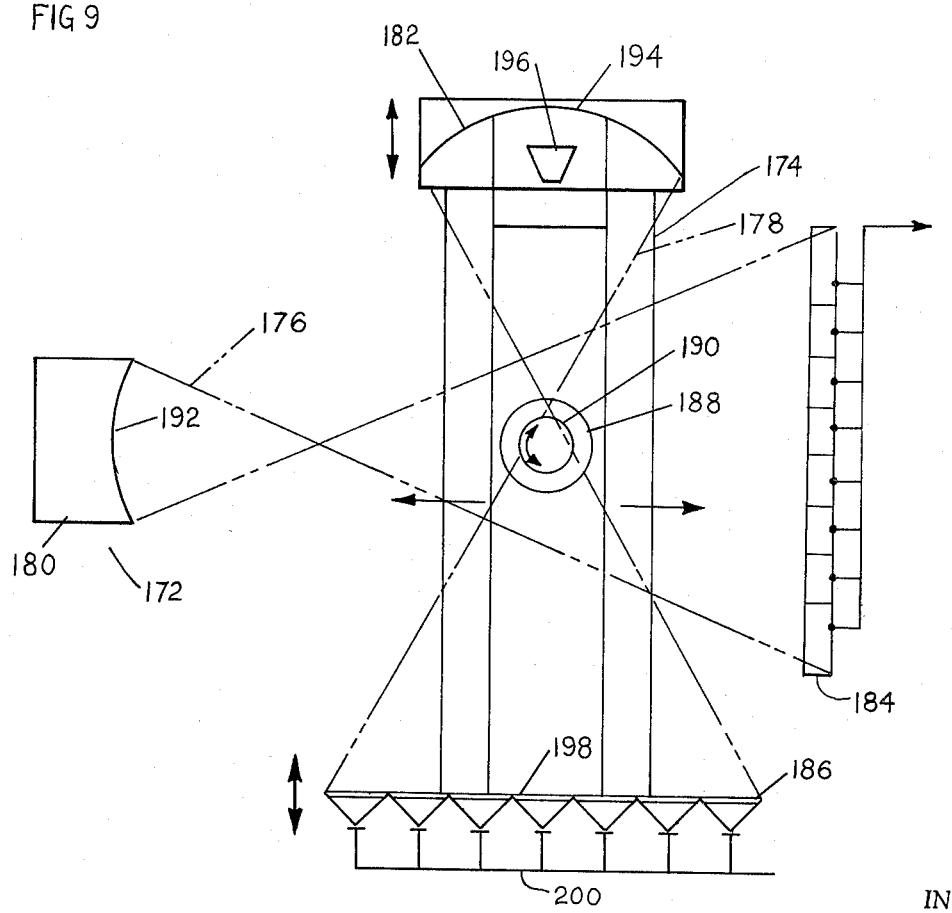
FIG. 9 is a schematic top plan view of another nondestructive testing arrangement of the arrangement of the invention similar to FIG. 5 but utilizing mixed energy sources.

With reference now to FIG. 9 of the drawings another modification 170 of my novel non-destructive testing arrangement shown therein comprises a fixed framework 172 and a movable framework 174 arranged after the manner of FIG. 5, with the exception that energy envelopes 176, 178 and sources 180, 182 are rotated 90° about their long axes relative to the energy envelopes of FIG. 5. The supporting hardware for the energy sources 180, 182 and the receiver assembly 184, 186 and also for the turntable 188 and object 190 can be arranged after the manner of FIG. 5 and will not be further described.

FIG. 9 illustrates in particular the use of mixed energy sources, and the teachings of FIG. 9 can be applied to any of the preceding modifications of the invention, which employ two or more sources. Accordingly source 180 is arranged to project the envelope 176 of ultrasonic energy and in this example is provided with a concave focusing surface 192. The array of ultrasonic receiver units 184 can be arranged as in previously described modifications of the invention.

The other energy source denoted generally by reference numeral 182 includes in this example a microwave antenna or focusing reflector 194 and a microwave horn 196, from which projected microwave energy is gathered by the antenna 194 and focused as energy envelope 178 onto an array of microwave receiving units 186. The microwave receiver 186 comprises in this example a tandem row of individual microwave receiving horns 198. The sources 180, 182 and the receiving units 184, 186 are conventionally available, as indicated previously. The microwave sending horn 196 is coupled through conventional waveguides to a microwave generator also of conventional structure. The aforementioned waveguides and generator are not illustrated. The individual microwave receiving horns 198 are similar in construction to the horn 196 with the exception that they conventionally include a crystal dioide for transducing the received microwave energy increments to output electric signals on branched conductor 200. Thus, both the ultrasonic transducers 184 and the microwave receivers 198 form segmented receiver arrangements, which are not disproportionate in size with respect to the smaller defects or anomalies usually encountered in a test object such as the object 190. This increases the resolution of the non-destructive testing arrangement 170 as set forth earlier herein.

In view of the foregoing modifications of the invention it will now be understood that verious forms of penetrative testing energies, or combinations of these as appropriate, can be utilized. In this connection, the basic form of the nondestructive testing apparatus is shown in FIGs. 1–3 is readily adaptable for use with low or high frequency ultrasonics, microwaves, or x-rays by way of examples. The use of low frequency ultrasonics is particularly desirable and is made practical by the testing arrangement of FIGS. 1, 3 for example by employment of a segmented receiver and a single energy source, which considerably enhances the resolution and efficiency of the testing arrangement, not withstanding the use of long wave lengths. As is known, low frequency ultrasonics are much less subject to attenuation such that use of a liquid couplant and resultant equipment complexity can be avoided. Similarly, the various modifications of the invention permit the use of x-band microwaves and avoid the structural complexities of high frequency microwave components. High frequency ultrasonics and microwaves in addition are limited to the testing of materials with relatively low attenuation at these frequencies.

As noted previously the FIGS. 1–3 and 5–6 modifications of the invention desirably incorporate some form of memory in the data processing circuitry 70 or 70' as there is no provision for the simultaneous comparison of an actual standard. Such memory can vary from the simple recordation of meter readings to sophisticated computer systems, depending upon the application of the invention and the complexity desired.

In those applications where a liquid couplant is employed (for higher frequencies of ultrasonics) it is contemplated that the commonly used couplant liquid, water, can be replaced by a liquid having an acoustical impedance closer to that of the material being tested. Ideally, of course, the mis-match in impedance should be zereo to transfer a maximum proportion of testing energy into the material and to avoid refraction effects. For certain applications it is desirable to employ a liquid couplant even with low frequency ultrasonics, depending upon material tested. The use of a liquid couplant can reduce transmission and reflectance losses. The use of low frequency ultrasonics in the disclosed arrangements is particularly beneficial for testing aluminum castings and fibreglass parts which in the past have not been satisfactorily tested with known non-destructive testing methods.

When using low frequency ultrasonics or microwaves in the disclosed arrangements it is desirable to traverse the test object platform 20 or 114 so that the receiver assembly or assemblies are located as close to the test object or objects as possible to minimize the "flow around" effects of long waves. Alternatively, means (not shown) can be provided for traversing the receiver assembly toward the object platform along the associated guide rails in any of the preceeding embodiments.

When testing very small parts, a conventional widely diverging lens system (not shown) for the particular testing energy can be mounted adjacent the receiver assembly to assure coverage of the individual receivers making up the assembly, Alternatively a condensing lens system can be utilized with the small part being placed between the foci thereof and the receiver assembly.

The use of microwaves as the penetrative energy is of course limited to non-metals. Microwave testing is advantageous in that suitable and known data processing equipment can relate signal and phase information of reflected and transmitted signals to provide additional information relevent to the internal and external portions of the test object. The use of microwave equipment as outlined herein imposes no serious structural limit upon the testing equipment in so far as size and power requirements are concerned. Microwave testing arrangements therefore are admirably suitable to large non-metal products such as vehicle tires. Low frequency or x-band hardware is readily available or can be extrapolated from existing designs.

As noted previously the use of the novel cross-testing arrangement of FIGS. 5–6 or 7–8 provides exact definition of location (depth) and size of a local anomaly. These modifications of the invention are readily adaptable to hybrid systems (FIG. 9), for example a combined ultrasonics and microwave arrangement. As noted previously, this last mentioned arrangement is admirably suited for the testing of cure states in elastimeric and other plastic materials. Generally, low frequency ultrasonics is desirable in conjunction with microwaves, to avoid the use of a liquid couplant, as microwaves are attenuated severally in most liquids. In certain applications combination of high frequency ultrasonics and low frequency ultrasonics may be useful for determining surface conditions by high ultrasonics pulse echo, while using the low frequency ultrasonics for in depth penetration. For example a combination metal and non-metal product can be inspected with this arrangement.

A combination of low frequency ultrasonics and x-band microwaves is very desirable for many applications. These energies tend to complement each other as pointed out in the preliminary paragraphs hereof.

The choice between a single test object system such as shown in FIGS. 1–3 and 5–6 and a double sample system such as shown in FIG. 4 and 8–9 can be based on a number of factors in addition to the obvious economic one. In the case of the double sample system, the psychology of comparing an unknown part to a physical standard is more easily understood and accepted. Calibration is straightforward in that two acceptable (or standard) specimens can be placed in the system, whereupon the receiver assemblies are each biased to zero to eliminate all system and part differences. A functional data processing system for a double sample arrangement desirably is a standard multi-channel recorder (not shown), with a channel for each receiver assembly or pair of assemblies. Analyses of "zoom" motions are simplified, since motions of both the test and standard specimens do not effect the comparison therebetween, in contrast to a single sample system wherein a standard part calibration is required at least in theory for each location to which the test platform is traversed along the guide rails therefor. Data analyzing circuitry can of course be simplified by elimination of an electronic standard and requisite memory circuits.

The use of the FIG. 4 embodiment with high frequency ultrasonic sources is particularly desirable for inspecting metal parts, particularly those with complex shapes such as jet engine rotor blades. The liquid couplant impedance should be as nearly matched as possible with that of the part inspected, and noted above. This system permits detecting small uniform metalurgical differences between successive specimens along with effective ability to detect local anomalies. Known procedures make no attempt to detect metalurgical differences. Substitution of microwave sources and hardware in the FIG. 4 arrangement is admirably suited for testing non-metallic specimens of irregular shape and of larger sizes. The use of low frequency ultrasonics in general provides the greatest penetration of all metallic and non-metallic specimens. However, the combination of low frequency ultrasonics and x-band microwaves in the configuration of either FIGS. 5–6 or 7–8 provides optimum inspection of small cure state changes in non-metal.

Suitable position indicating circuitry (not shown) can be coupled between the several motion means of the object platform 20 or 114 or similar platforms of the several figures and the associated receiver assemblies and the data analyzing circuitry to supply complete test object position and receiver output data for a predetermined object motion or scan cycle from a given index position. As noted previously a complete series of X Y Z and W motions can be imparted to the test object throughout an inspectional cycle.

In operation, referring to FIG. 4 of the drawings, the testing apparatus is first calibrated as follows: The specimen platform 20' is traversed to a point near the receiver assemblies 58x, 58y. A pair of standard or acceptable specimens 46a, 46b are positioned in the specimen holder or holders 50'. The specimen table 26' is then elevated (after the manner of FIG. 1) to locate the centers of the specimens approximately on the center lines of the energy envelopes 66'. The test platform 20' is then traversed toward the sources 56a, 56b until the shadows of the specimens are distributed over the receiver assemblies 58x, 58y. Minor adjustments are then made along the X, Y, Z axes with the test objects or specimens 46a, 46b oriented substantially as shown in FIG. 4, until signals from the top and bottom individual receivers are balanced. The analyzing circuitry 70' is then adjusted in a conventional manner to bias the signal outputs of each receiver assembly to zero. The test platform 20' and associated components are then manipulated through a sequence of X Y Z and W motions until all portions of the specimens are scanned in this manner. For repetitive inspections, a series of scan limit stops (not shown) can be employed. Various alarm or other tolerance limits can be set on the analyzing circuitry as desired for various quality standards.

Following calibration, one of the standard specimens is replaced with an unknown part and the aforementioned scan cycle is repeated. If there is no alarm or other out-of-tolerence indication the unknown part is replaced with a successive unknown part. If there is an alarm, a detailed analysis can be made if the alarm indicates a subsurface anomaly. In this connection zoom motion can be imparted to the test platform 20' until an optimum receiver readout is obtained. The aforementioned scan cycle can then be repeated at the new location, after zeroing the receiver assemblies if required. Scanning can then be repeated at various zoom positions for further condition analysis.

From the foregoing it will be apparent that novel and efficient forms of Non-destructive Testing procedures have been described herein. While I have shown and described certain presently preferred embodiments of the invention and have illustrated presently preferred methods of practicing the same it is to be distinctly understood that the invention is not limited thereto but may be otherwise variously embodied and practiced within the spirit and scope of the invention.

I claim:

1. A non-destructive testing arrangement comprising a penetrative energy source capable of emitting an energy envelope, means for expanding said envelope primarily in one plane, a receiver assembly positioned to intercept said envelope and capable of developing proportional electric signals upon reception of said energy, means for mounting said source and said receiver assembly in spaced alignment, means for mounting a test object intermediate said source and said receiver assembly so as to intercept at least a portion of said envelope, said receiver assembly including a tandem array of individual receivers, said array being aligned with said plane, and means for relatively moving said test object mounting means along a path extending between said source and said receiver assembly in substantial alignment with said energy envelope while maintaining one of said object mounting means and said energy source and receiver assembly substantially and relatively in place to produce a zoom effect of any flaws of said object at an image made on said receiver assembly.

2. The combination according to claim 1 wherein said test object mounting means additionally are provided with means for moving said object transversely of said expanding envelope plane.

3. The combination according to claim 1 wherein said test object mounting means additionally are provided with means for rotating said test object about an axis thereof.

4. The combination according to claim 1 wherein said test object mounting means additionally are provided with means for moving said test object transversely of said envelope but generally parallel to said expanding plane thereof.

5. The combination according to claim 1 wherein said test object mounting means include a platform slidably mounted on guide rail means extending between supports forming part of said source and said receiver assembly mounting means.

6. The combination according to claim 5 wherein said guide rail means include a pair of generally parallel guide rails, one of said guide rails is threaded and rotatably mounted in said supports, said platform being threadedly engaged with said one guide rail, and means are provided for rotating said threaded guide rail for traversing said platform therealong.

7. A non-destructive testing arrangement comprising a penetrative energy source capable of emitting an energy envelope, means for expanding said envelope primarily in one plane, a receiver assembly positioned to intercept said envelope and capable of developing porportional electric signals upon reception of said energy, means for mounting said source and said receiver assembly in spaced alignment, means for mounting a test object intermediate said source and said receiver assembly so as to intercept at least a portion of said envelope, said receiver assembly including a tandem array of individual receivers, said array being aligned with said plane and with the interception of said envelope including an object image on said receiver assembly, a second energy source similarly mounted adjacent the firstmentioned source, a second receiver assembly similarly mounted adjacent the first-mentioned receiver assembly in alignment with a second energy envelope emitted by said second source, means for similarly expanding said second envelope in a plane substantially parallel to the first-mentioned envelope plane, said test object mounting means including means for mounting a pair of test objects on a common support and in alignment respectively with said envelopes, said sources and said receiver assemblies being further disposed in respective alignment with said energy envelopes, and means for moving said common support for a scanning of said objects.

8. A non-destructive testing arrangement comprising a penetrative energy source capable of emitting an energy envelope, means for expanding said envelope primarily in one plane, a receiver assembly positioned to intercept said envelope and capable of developing proportional electric signals upon reception of said energy, means for mounting said source and said receiver assembly in spaced alignment, means for mounting a test object intermediate said source and said receiver assembly so as to intercept at least a portion of said envelope, said receiver assembly including a tandem array of individual receivers, said array being aligned with said plane and with the interception of said envelope including an object image on said receiver assembly, and means for moving each of said source and said receiver assembly laterally and independently of said test object and of one another for adjustment purposes.

9. A non-destructive testing arrangement comprising a penetrative energy source capable of emitting an energy envelope means for expanding said envelope primarily in one plane, a receiver assembly positioned to intercept said envelope and capable of developing porportional electric signals upon reception of said energy, means for mounting said source and said receiver assembly in spaced alignment, means for mounting a test object intermediate said source and said receiver assembly, so as to intercept at least a portion of said envelope, said receiver assembly including a tandem array of individual receivers, said array being aligned with said plane, a second such source and a second such receiver assembly spacedly and alignedly mounted such that an energy envelope from said second source is intercepted by said second receiver assembly, said second source envelope substantially intercepting said first-mentioned envelope at said test object, and means for relatively moving said test object mounting means longitudinally between said first-mentioned source and receiver assembly and for relatively moving said mounting means longitudinally between said second source and said second receiver assembly along paths in substantial and respective alignment with said energy envelopes while maintaining one of said object mounting means and associated energy sources and receiver assemblies substantially and relatively in place to produce zoom effects of any flaws of said object at at least one of the images made on said receiver assemblies respectively.

10. The combination according to claim 9 wherein said moving means are so configured that said test object is maintained at said envelope intersection irrespective of longitudinal movement relative to either or both of said sources.

11. The combination according to claim 10 wherein said object mounting means and said moving means include a platform slidably mounted on a guide mechanism extending between said first-mentioned source and receiver assembly, a second guide mechanism is slidably mounted on said platform for movement transversely of said first-mentioned guide mechanism, said second source and said second receiver assembly being mounted adjacent the ends respectively of said second guide mechanism.

12. The combination according to claim 11 wherein each of said guide mechanisms includes a pair of guide rails, a guide rail of each of said mechanisms being threaded and being threadedly engaged with said platform, each of said threaded guide rails being rotatably mounted adjacent its ends in supports therefor respectively adjacent the associated source and receiver assembly, and means are provided for rotating each of said threaded guide rails.

13. The combination according to claim 11 wherein a turntable for said test object is rotatably mounted on said platform substantially at said intersection.

14. The combination according to claim 13 wherein means are mounted on said platform for elevating said turntable relative to said platform.

15. A non-destructive testing arrangement comprising a penetrative energy source capable of emitting an energy envelope, means for expanding said envelope primarily in one plane, a receiver assembly positioned to intercept said envelope and capable of developing proportional electric signals upon reception of said energy, means for mounting said source and said receiver assembly in spaced alignment, means for mounting a test object intermediate said source and said receiver assembly so as to intercept at least a portion of said envelope, said receiver assembly including a tandem array of individual receivers, said array being aligned with said plane and with the interception of said envelope including an object image on said receiver assembly, a second such source and a second such receiver assembly spacedly and alignedly mounted such that an energy envelope from said second source is intercepted by said second receiver assembly, said second source envelope substantially intercepting said first-mentioned envelope at said test object, said sources being positioned so that said envelope interception contains a long transverse axis of each of said envelopes, and means for moving each of said sources and its associated receiver assembly laterally and independently of said object and of one another for adjustment purposes.

16. A non-destructive testing arrangement comprising a penetrative energy source capable of emitting an energy envelope, means for expanding said envelope primarily in one plane, a receiver assembly positioned to intercept said envelope and capable of developing proportional electric signals upon reception of said energy, means for mounting said source and said receiver assembly in spaced alignment, means for mounting a test object intermediate said source and said receiver assembly so as to intercept at least a portion of said envelope, said receiver assembly including a tandem array of individual receivers, said array being aligned with said plane and with the interception of said envelope including an object image on said receiver assembly, a second such source and a second such receiver assembly spacedly and alignedly mounted such that an energy envelope from said second source is intercepted by said second receiver assembly, said second source envelope substantially intercepting said firstmentioned envelope at said test object, said sources being positioned so that said envelope interception contains a long transverse axis of each of said envelopes, said second source being capable of emitting and said second receiver assembly being capable of receiving a different type of penetrative energy from that of said first-mentioned source.

17. A non-destructive testing arrangement comprising a penetrative energy source capable of emitting an energy envelope, means for expanding said envelope primarily in one plane, a receiver assembly positioned to intercept said envelope and capable of developing proportional electric signals upon reception of said energy, means for mounting said source and said receiver assembly in spaced alignment, means for mounting a test object intermediate said source and said receiver assembly so as to intercept at least a portion of said envelope, said receiver assembly including a tandem array of individual receivers, said array being aligned with said plane and with the interception of said envelope including an object image on said receiver assembly, a second such source and a second such receiver assembly spacedly and alignedly mounted such that an energy envelope from said second source is intercepted by said second receiver assembly, said second source envelope substantially intercepting said firstmentioned envelope at said test object, said sources being positioned so that said envelope interception contains a long transverse axis of each of said envelopes, a third source and third receiver assembly mounted respectively adjacent said first-mentioned source and receiver assembly for emitting and receiving respectively a similarly shaped energy envelope substantially parallel to said first-mentioned envelope, a fourth source and a fourth receiver assembly mounted respectively adjacent said second source and said second receiver assembly for emitting and receiving respectively a similarly shaped fourth energy envelope substantially parallel to said second envelope, said object mounting means including a common support for mounting said object and a second object so that said objects respectively are positioned substantially at the intersections of said envelopes, and means for moving said common support for a scanning of said objects.

18. The combination according to claim 17 wherein said object mounting means further include means for mounting said objects respectively at the intersections of said first and second envelopes and of said third and fourth envelopes.

19. A non-destructive testing arrangement comprising at least two sources of penetrative energies, a receiver for each of said sources and alignable respectively with an associated one of said sources, means for mounting one of said sources and its associated receiver in spaced alignment, means for similarly mounting the other source and its associated receiver such that an energy envelope of said other source intersects an energy envelope of said one source, means for mounting a test specimen at an intersection of said envelopes, means for moving said specimen mounting means longitudinally between said sources and said receivers respectively along paths in substantial and respective alignment with said energy envelopes while maintaining one of said specimen mounting means and said energy sources and receivers respectively and substantially and relatively in place to produce zoom effects of any flaws of said specimen at at least one of the images made on said receivers.

20. The combination according to claim 19 wherein said longitudinally moving means are configured such that said test specimen is maintained at said envelope intersection irrespective of longitudinal movement of said specimen relative to at least one of said sources.

21. A method for non-destructive testing, said method comprising the steps of mounting a source of penetrative energy and a receiver therefor in spaced alignment, mounting a test specimen therebetween to intercept an energy envelope from said source, expanding said envelope in a single transverse direction thereof substantially in a plane extending between said source and said receiver, elongating said receiver in said transverse direction, segmenting said receiver along the length thereof, developing signals in each of the receiver segments in proportion to the portion of said envelope projected thereon, and relatively moving said specimen along a path extending between said source and said receiver while maintaining one of said specimen and said source and receiver substantially and relatively in place to produce a zoom effect of any flaws of said specimen at an image made on said receiver.

* * * * *